United States Patent [19]
Bergins et al.

[11] Patent Number: 5,826,198
[45] Date of Patent: Oct. 20, 1998

[54] TRANSMISSION OF DATA OVER A RADIO FREQUENCY CHANNEL

[75] Inventors: Lewis A. Bergins, Millis; Michael Onorato, Acton; Jerry Falk, Medway; Richard Carey, Ashland; Dennis Kloc, Jamaica Plain; Roy Greene, Franklin, all of Mass.

[73] Assignee: Microcom Systems, Inc., Norwood, Mass.

[21] Appl. No.: 888,444

[22] Filed: Jul. 7, 1997

Related U.S. Application Data

[63] Continuation of Ser. No. 392,298, Feb. 22, 1995, abandoned, which is a continuation of Ser. No. 86,766, Jul. 2, 1993, abandoned, which is a continuation of Ser. No. 819,287, Jan. 13, 1992, abandoned.

[51] Int. Cl.$^6$ .............................. H04B 1/38; H04M 1/00
[52] U.S. Cl. ...................... 455/557; 455/434; 455/67.1
[58] Field of Search ..................... 455/422, 450, 455/62, 550, 556, 557, 575, 126, 95, 69, 115, 63, 527, 226.1–226.3, 67.1, 67.3, 406, 407, 517, 434, 515

[56] References Cited

U.S. PATENT DOCUMENTS

| | | | |
|---|---|---|---|
| 4,696,057 | 9/1987 | Otani | 455/226.3 |
| 4,697,281 | 9/1987 | O'Sullivan | 455/33.1 |
| 4,885,794 | 12/1989 | Sgrignoli | 455/126 |
| 4,905,302 | 2/1990 | Childress et al. | 455/34.1 |
| 4,908,848 | 3/1990 | Hanawa | 379/58 |
| 4,912,756 | 3/1990 | Hop | 379/60 |
| 4,972,457 | 11/1990 | O'Sullivan | 379/63 |
| 5,003,584 | 3/1991 | Beyacar et al. | 379/91 |
| 5,134,708 | 7/1992 | Marui et al. | 455/54.1 |
| 5,197,093 | 3/1993 | Knuth et al. | 455/34.1 |
| 5,203,011 | 4/1993 | Bane et al. | 455/34.1 |
| 5,203,012 | 4/1993 | Patsiokas et al. | 455/34.1 |
| 5,233,642 | 8/1993 | Renton | 379/91 |
| 5,241,565 | 8/1993 | Kloc et al. | 375/58 |

FOREIGN PATENT DOCUMENTS

| 9107044 | 5/1991 | WIPO | 379/59 |
|---|---|---|---|

*Primary Examiner*—Nguyen Vo
*Attorney, Agent, or Firm*—Lappin & Kusmer LLP

[57] ABSTRACT

An improved system for the transmission of data over a cellular telephone channel is provided. The system is especially adapted to reduce the cost associated with cellular telephone calls by allowing data transmission only when the channel signal level is greater than a pre-defined value, so as maximize the probability that a transmission will be successful. In addition, the system provides for user transparent reconnection and reestablishment of a dropped link, allowing transmission to continue where dropped without the need to retransmit data already successfully received. As an additional benefit, the system provides a mechanism for call timing and billing so that an estimated bill may be generated based on connection time.

17 Claims, 8 Drawing Sheets

Cellular Call Analysis

| Prt | Chk | Date | Time | Unit Id | Rx Sig | SID | Un sc Ca | Byte Count | Send CD Time | Conn Time | Est. Bill Time |
|---|---|---|---|---|---|---|---|---|---|---|---|
| 1 | OK | 8/17 | 14:09:28 | 52839 | 1 | 25 | 12 | 286 | 17.9 | 3.6 | 21.5 |
| 1 | OK | 8/17 | 14:10:54 | 47170 | 6 | 22 | 1 | 286 | 19.2 | 3.6 | 22.8 |
| 1 | OK | 8/17 | 14:12:45 | 47170 | 5 | 22 | 0 | 2078 | 18.3 | 8.3 | 26.6 |
| 1 | OK | 8/17 | 14:14:06 | 52839 | 6 | 25 | 0 | 2078 | 18.3 | 8.9 | 27.2 |
| 1 | OK | 8/17 | 14:15:26 | 52839 | 6 | 25 | 1 | 286 | 19.7 | 3.6 | 23.3 |
| 1 | OK | 8/17 | 14:58:20 | 52839 | 1 | 25 | 0 | 286 | 17.9 | 3.6 | 21.5 |
| 1 | man | 8/19 | 15:00:00 | | | | | | | | |
| 1 | OK | 8/17 | 15:01:25 | 52839 | 3 | 25 | 1 | 286 | 18.2 | 3.6 | 21.8 |
| 1 | OK | 8/17 | 15:09:40 | 52839 | 2 | 25 | 1 | 2078 | 19.0 | 8.0 | 27.0 |
| 1 | OK | 8/17 | 15:11:05 | 52839 | 3 | 25 | 0 | 1182 | 17.8 | 8.6 | 26.4 |
| 1 | OK | 8/17 | 15:15:17 | 47170 | 5 | 22 | 1 | 286 | 18.2 | 3.6 | 21.8 |
| 1 | OK | 8/17 | 15:18:04 | 47170 | 0 | 22 | 1 | 798 | 19.1 | 5.1 | 24.2 |
| 1 | OK | 8/17 | 15:30:53 | 52839 | 6 | 25 | 5 | 286 | 17.4 | 3.6 | 21.0 |
| 1 | OK | 8/17 | 15:31:59 | 52839 | 6 | 25 | 0 | 798 | 18.0 | 5.6 | 23.6 |
| 1 | OK | 8/17 | 15:38:56 | 52839 | 6 | 25 | 1 | 1182 | 17.4 | 9.0 | 26.4 |
| 1 | INF | 8/17 | 15:46:27 | 0 | 5 | 22 | ** | 158 | 0.0 | 0.0 | 0.0 |
| 1 | INF | 8/17 | 15:47:40 | 0 | 5 | 22 | 0 | 158 | 0.0 | 0.0 | 0.0 |
| 1 | OK | 8/17 | 15:50:08 | 47170 | 5 | 22 | 1 | 798 | 19.6 | 5.1 | 24.7 |
| 1 | OK | 8/17 | 15:52:34 | 47170 | 5 | 22 | 0 | 2078 | 19.3 | 8.9 | 28.2 |
| 1 | OK | 8/17 | 15:59:29 | 52839 | 6 | 25 | 1 | 286 | 17.1 | 6.1 | 23.2 |
| 1 | OK | 8/17 | 16:00:33 | 52839 | 6 | 25 | 0 | 798 | 17.7 | 5.5 | 23.2 |
| 1 | OK | 8/17 | 16:03:23 | 52839 | 5 | 25 | 1 | 1182 | 17.4 | 6.6 | 24.0 |
| 1 | OK | 8/17 | 16:04:50 | 52839 | 3 | 25 | 1 | 2078 | 17.7 | 22.4 | 40.1 |
| 1 | OK | 8/17 | 16:07:47 | 52839 | 6 | 25 | 2 | 2078 | 18.0 | 8.3 | 26.3 |
| 1 | OK | 8/17 | 16:10:08 | 47170 | 6 | 22 | 3 | 286 | 19.2 | 3.6 | 22.8 |
| 1 | OK | 8/17 | 16:11:30 | 47170 | 5 | 22 | 1 | 798 | 19.2 | 5.5 | 24.7 |
| 1 | OK | 8/17 | 16:12:49 | 47170 | 6 | 22 | 0 | 1182 | 19.5 | 6.7 | 26.2 |
| 1 | OK | 8/17 | 16:14:18 | 47170 | 6 | 22 | 2 | 2078 | 18.8 | 8.4 | 27.2 |
| 1 | OK | 8/17 | 16:15:57 | 52839 | 6 | 25 | 0 | 2078 | 18.3 | 8.3 | 26.6 |
| 1 | OK | 8/17 | 16:19:49 | 52839 | 6 | 25 | 2 | 286 | 17.9 | 3.6 | 21.5 |
| 1 | OK | 8/17 | 16:30:31 | 52839 | 5 | 25 | 5 | 286 | 18.2 | 3.6 | 21.8 |
| 1 | OK | 8/17 | 16:31:29 | 52839 | 5 | 25 | 0 | 798 | 19.1 | 5.1 | 24.2 |
| 1 | OK | 8/17 | 16:33:51 | 52839 | 6 | 25 | 1 | 1182 | 18.2 | 5.9 | 24.1 |
| 1 | OK | 8/17 | 16:34:49 | 52839 | 5 | 25 | 0 | 2078 | 19.0 | 7.5 | 26.5 |
| 1 | OK | 8/17 | 16:36:00 | 47170 | 6 | 22 | 0 | 286 | 20.1 | 3.6 | 23.7 |
| 1 | OK | 8/17 | 16:37:02 | 47170 | 6 | 22 | 0 | 798 | 18.9 | 5.6 | 24.5 |
| 1 | OK | 8/17 | 16:37:59 | 47170 | 6 | 22 | 0 | 1182 | 19.2 | 6.8 | 26.0 |
| 1 | OK | 8/17 | 16:39:01 | 47170 | 6 | 22 | 0 | 2078 | 18.8 | 7.5 | 26.3 |
| 1 | OK | 8/17 | 16:40:38 | 52839 | 5 | 25 | 0 | 1182 | 20.9 | 6.8 | 27.7 |
| 1 | OK | 8/17 | 16:41:42 | 52839 | 5 | 25 | 0 | 2078 | 18.0 | 8.0 | 26.0 |
| 1 | OK | 8/17 | 16:43:08 | 47170 | 5 | 22 | 0 | 286 | 18.5 | 5.6 | 24.1 |
| 1 | OK | 8/17 | 16:44:13 | 47170 | 6 | 22 | 0 | 798 | 18.2 | 5.1 | 23.3 |
| 1 | OK | 8/17 | 16:50:48 | 52839 | 6 | 25 | 2 | 286 | 18.0 | 3.6 | 21.6 |
| 1 | OK | 8/17 | 16:51:44 | 52839 | 6 | 25 | 0 | 798 | 17.8 | 5.5 | 23.3 |
| 1 | OK | 8/17 | 16:52:47 | 52839 | 6 | 25 | 0 | 1182 | 17.5 | 6.8 | 24.3 |
| 1 | OK | 8/17 | 16:53:45 | 52839 | 6 | 25 | 0 | 2078 | 18.5 | 7.4 | 25.9 |
| 1 | OK | 8/17 | 16:54:56 | 47170 | 6 | 22 | 0 | 286 | 20.2 | 3.6 | 23.8 |
| 1 | OK | 8/17 | 16:56:00 | 47170 | 6 | 22 | 0 | 798 | 16.7 | 7.0 | 23.7 |
| 1 | OK | 8/17 | 16:57:14 | 47170 | 6 | 22 | 1 | 1182 | 18.4 | 6.7 | 25.1 |
| 1 | OK | 8/17 | 16:58:29 | 47170 | 6 | 22 | 0 | 2078 | 18.5 | 7.4 | 25.9 |

TRANSMISSION OF DATA OVER A RADIO FREQUENCY CHANNEL

This is a continuation of application Ser. No. 08/392,298 filed on Feb. 22, 1995, now abandoned, which application is a continuation application Ser. No. 08/086,766 filed on Jul. 2, 1993, now abandoned, which is a continuation application Ser. No. 07/819,287 filed on Jan. 13, 1992, now abandoned.

This invention relates, generally, to the field of electronic data transmission, and more particularly to the transmission of data over a radio frequency channel such as that utilized by a cellular telephone link.

BACKGROUND OF THE INVENTION

Field of the Invention

Recently, the availability of cellular telephone communication service has increased dramatically. All major metropolitan areas, and many less populated areas, are served by at least one cellular telephone company. The development of this cellular network has resulted in providing a widespread capability to communicate with a mobile telephone subscriber by the use of an RF cellular telephone channel and the existing public switched telephone network, almost anywhere in the country. As cellular telephone systems and equipment have proliferated, there has developed an increased demand for the transmission of not only voice information, but also data. Unfortunately, the transmission of data over a cellular telephone link presents additional problems not encountered with the transmission of simple analog voice information.

In particular, while the introduction of noise into voice communication may create some problems of intelligibility, in general, unless there is a complete loss of signal, the voice message will still be transmitted and recognized. On the other hand, when transmitting data in a digital form, any noise encountered on the communications channel will most likely corrupt the data being transmitted, thereby requiring the same data to be retransmitted. Similarly, a break in transmission while transmitting data, as is often the case in cellular transmissions, requires retransmission of all of the data. Retransmission of data results in a lower throughput bandwidth due to the extended time necessary to transmit data. In addition, since the cellular network is more expensive to use due to its associated higher tariffs (compared to comparable land lines), such retransmission can increase operating costs substantially.

While it has been known to interface common data terminal equipment and modems to a cellular telephone transceiver, such attempts have not been optimized for use in a cellular RF environment, and thus are large, expensive and inefficient.

Accordingly, it has been determined that the need exists for an improved apparatus for the transmission of data over an RF channel which will provide increased reliability of data transmission as well as a reduction of operating costs, thereby improving upon the above-noted limitations of the prior art.

OBJECTS OF THE PRESENT INVENTION

Accordingly, it is an object of the invention to provide an improved apparatus for the transmission of data over an RF channel.

It is another object of the invention to provide an improved apparatus for the transmission of data over an RF channel where the channel is a cellular telephone link.

It is a further object of the invention to provide an improved apparatus for the transmission of data over an RF channel whereby a connection will not be attempted until the signal level of the data channel is above a predefined threshold.

It is still a further object of the invention to provide an improved apparatus for the transmission of data over an RF channel wherein the communication link will be automatically disconnected when it has been determined that the signal level has fallen below a predetermined level.

It is yet another object of the invention to provide an improved apparatus for the transmission of data over an RF channel wherein the standard Microcom® network protocol (MNP®) (defined hereinafter) is modified so that all transmitted packets are continually repeated until the remote modem acknowledges receipt or is disconnected by an auto disconnect mechanism.

It is still another object of the invention to provide an improved apparatus for the transmission of data over an RF channel whereby, when a communications link is dropped due to poor signal quality, the connection will be transparently re-established and the session will be continued from the point where the disconnect interrupted the transmission.

It is yet a further object of the invention to provide an improved apparatus for the transmission of data over an RF channel which tracks the costs associated with the use of a cellular telephone channel.

It is even another object of the invention to provide an improved apparatus for the transmission of data over an RF channel which is optimized to reduce the costs associated with the transmission of data over a cellular telephone channel.

It is yet an additional object of the invention to provide an improved apparatus for the transmission of data over an RF channel which may be integrated to an existing cellular telephone transceiver.

It is even another object of the invention to provide an improved apparatus for the transmission of data over an RF channel to improve upon the limitations noted in the prior art.

Still other objects and advantages of the invention will, in part, be obvious and, will, in part, be apparent from the specification.

SUMMARY OF THE INVENTION

Generally speaking, in accordance with the invention, an apparatus for the improved transmission of data over an RF channel is provided. The invention, which optimizes the transmission of data through a cellular network, provides an effective mobile data solution which increases data throughput while also lowering user costs.

In a preferred configuration, the invention is designed to monitor a cellular channel's signal strength and only permit communications when the signal level is above a predefined threshold, from which it may then be determined that a call reliably can be made.

In addition, the invention embodies an automatic disconnect on low signal strength so that should a call be initiated in an area where the signal strength is sufficient to permit reliable data communications, but the data channel quality then becomes degraded during transmission, communications will automatically be halted in order to reduce the number of unsuccessful retransmission attempts, and thereby reduce unnecessary associated telephone costs.

The invention further incorporates a modification to the Microcom network protocol (MNP), a protocol designed and developed by Microcom, Inc. of Norwood, Mass., and described at length in Microcom Network Protocol Specification Link Services Class 1–4, Oct. 1987 and Microcom Network Protocol Specification Class 10. Version 1.0. Oct., 1991, whereby transmitted packets of data are continually repeated until the remote modem acknowledges receipt of the packet or is disconnected by the above-described auto disconnect feature.

Further to the development of the invention is an automatic dial connection restoration mechanism whereby, when a communications link is dropped due to noisy or poor quality transmission conditions, the connection between the transmitting and receiving stations will be transparently re-established and the transmission of data will resume from the point of the last known good packet transmission, thereby reducing the costs associated with the retransmission of the entire file.

Finally, the invention also incorporates billing timers which may be used to supplant the normal billing information which is available over a standard wired telephone system, but which is not provided with a cellular telephone system.

Other objects of the invention will in part be obvious and will in part appear hereinafter. The invention accordingly comprises the apparatus possessing the construction, combination of elements and arrangements of parts which are exemplified in the following detailed disclosure, and the scope of the application of which will be indicated in the claims.

BRIEF DESCRIPTION OF THE DRAWINGS

For a fuller understanding of the invention, reference is had to the following descriptions taken in connection with the accompanying drawings, in which:

FIG. 7 is a chart illustrating sample billing information collected and transmitted in accordance with a preferred embodiment of the invention;

DETAILED DESCRIPTION OF THE DRAWINGS

Figure 1:
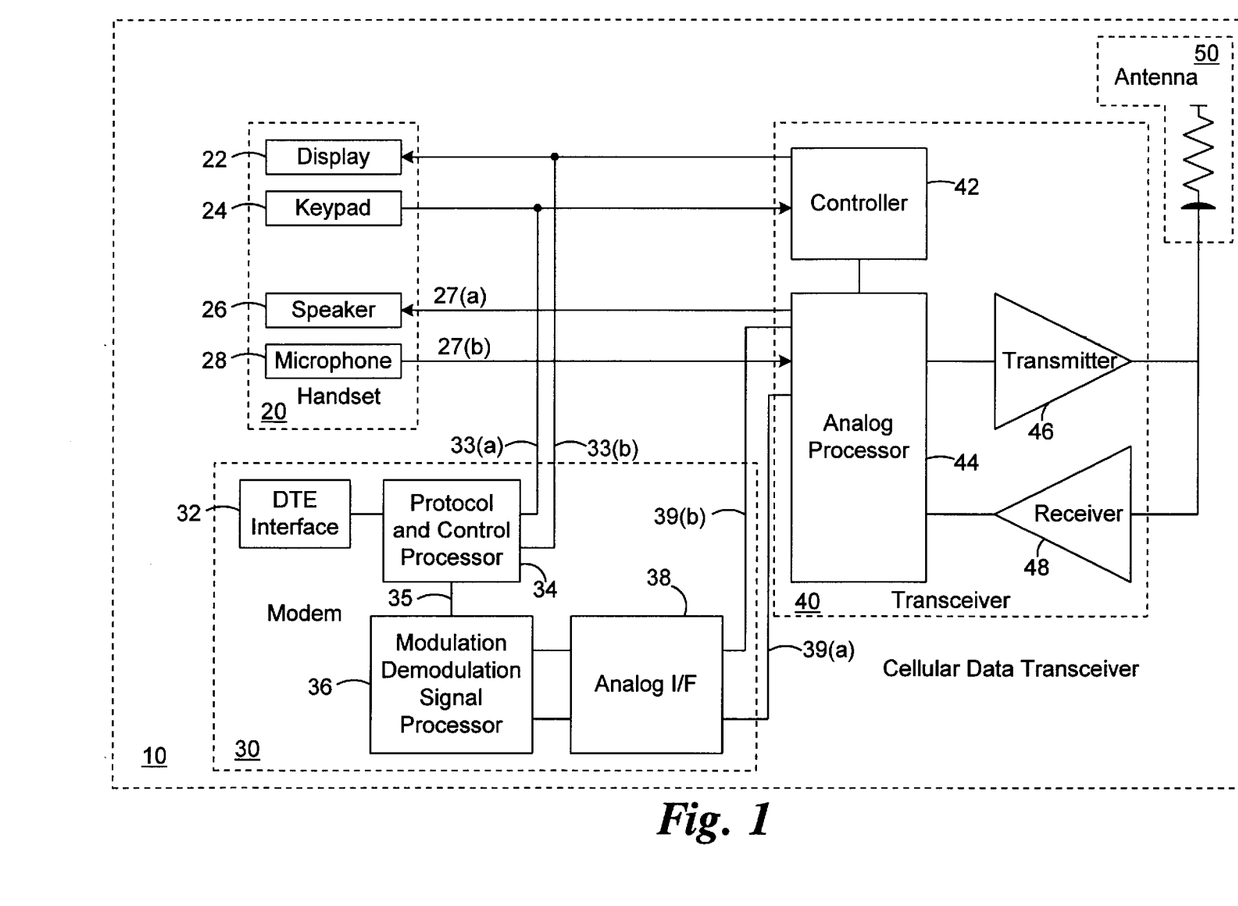
FIG. 1 is a block diagram of a cellular data transceiver constructed in accordance with a preferred embodiment of the present invention.

Referring first to FIG. 1, a block diagram of an apparatus for the improved transmission of data over an RF channel, constructed in accordance with a preferred embodiment of the present invention, is shown. An improved cellular data transceiver, generally 10, includes a handset assembly 20, a modem assembly 30, and an RF transceiver assembly 40. A transmitting and receiving antenna 50, of standard design, is also provided.

Referring first to handset 20 and transceiver 40, these are of a well-known design, one such example of which is the MITSUBUSHI Model 1500 Cellular Telephone. Handset 20 incorporates a display 22, which is preferably of a liquid crystal variety, a keypad 24, a speaker or earpiece 26, and a microphone 28. Each of these elements is well-known and need not be modified for incorporation into the present invention. Handset 20 interfaces with transceiver 40 via a controller 42 and an analog processor 44. Controller 42 comprises a multi-function CPU which receives input from keypad 24 of handset 20 and provides return information to display 22. Controller 42 also directly interfaces with analog processor 44 which is responsible for controlling the flow of voice information from microphone 28 through an audio signal path 27(b) on through to transmitter 46 and for controlling the receipt of voice information from receiver 48 through an audio signal path 27(a) on through to speaker 26. Because of the nature of the RF system used in current cellular telephone design, a single transmission and reception antenna 50 may be incorporated.

Completing the cellular data transceiver 10 is modem 30 which includes a data terminal equipment (DTE) interface 32, a protocol and control processor 34, a modulation/demodulation signal processor 36, and analog interface 38. DTE interface 32 provides for the physical connection between data equipment external to the cellular data transceiver and the cellular data transceiver itself. In a preferred embodiment, DTE interface 32 may provide either a serial or parallel interface and may terminate at the body of the cellular data transceiver with a standard connector, such as a nine pin or twenty-five pin DB connector. DTE interface 32 passes data to protocol and control processor 34 which, in the preferred embodiment, is based on a microprocessor controller such as the Rockwell R65C19 or the Zilog Z80. Protocol and control processor 34 incorporates a complimentary pair of control lines 33(a) and 33(b) which are connected in parallel to the interface between display 22 and controller 42 and keypad 24 and controller 42. In particular, control line 33(a) is an output line which allows the protocol and control processor 34 to emulate keypad 24 as seen by transceiver controller 42. Control line 33(b) is an input line to protocol and control processor 34 which allows the protocol and control processor to "see" the messages which would otherwise be displayed on display 22 by transceiver controller 42. Protocol and control processor 34 is connected through line 35 to analog modulation and demodulation signal processor 36, the latter converting information to modulated data signals and modulated data to demodulated signals. Communication between processor 36 and transceiver 40 occurs through interface 38. Interface 38 includes an output 39(a) which is connected as an input to analog processor 44 of transceiver 40. This line allows the modulation/demodulation signal processor 36 to provide modulated audio frequency tones through the interface 38 to analog processor 44 so that digital data, modulated as tones, may then be transmitted by transmitter 46 through antenna 50. Interface 38 also has an input line 39(b) which is connected as an output from analog processor 44 so that modulation/demodulation signal processor 36 may receive analog audio information in the form of audio frequency signals received by receiver 48 through antenna 50 and provided through the interface 38, and then demodulate this analog audio information back into a digital data stream.

By incorporating an architecture as described above, modem 30 is able to transparently interface with transceiver 40 in a manner that allows modem 30 not only to transmit and receive analog audio information via analog processor 44, but also to emulate the functions of keypad 24 and display 22 in order to permit modem 30 to control the actual operation of transceiver 40 without intervention on the part of a user or operator. This capability of hands-free automatic control is critical in a data transmission and reception application since, as previously discussed, in a cellular radio environment, signal quality may vary widely during a signal transmission and reception session. In such a case, it may be necessary to start and stop the transmission of data on a frequent basis. In addition, data links may need to be broken and reconnected many times during the transmission of a single file of data, and by this invention this may be accomplished without any intervention on the part of the user or operator. Referring next to FIGS. 2–7, a detailed discussion of each of the controller mechanisms incorporated in the improved apparatus for transmission of data over an RF channel, will be described.

Figure 2:
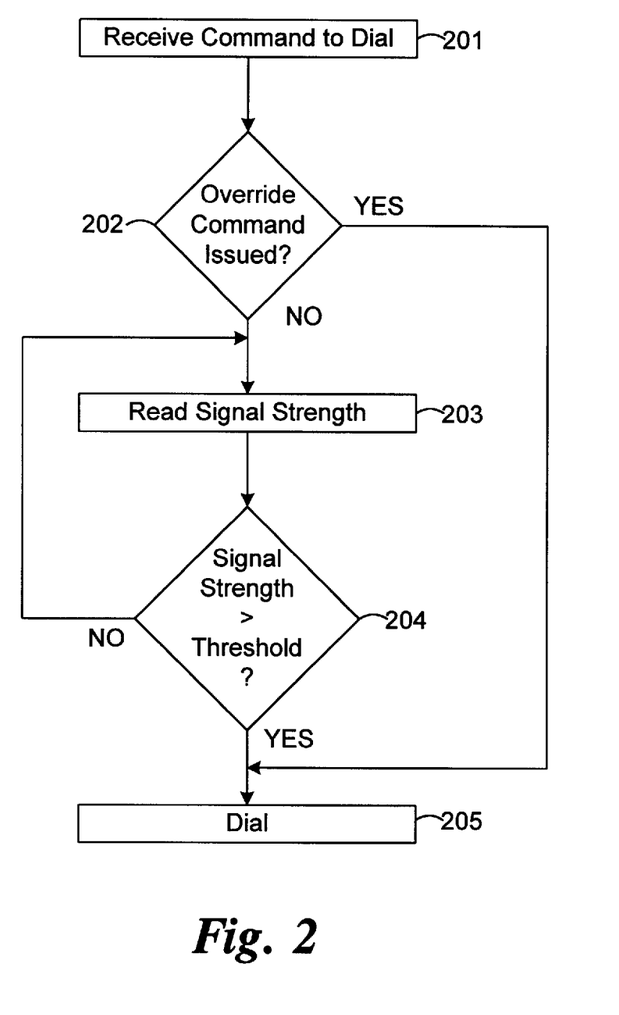
FIG. 2 is a flow chart of the process as performed by the software under control of the cellular data transceiver of FIG. 1, wherein transceiver operations are controlled based upon cellular signal strength.

The flow chart of FIG. 2 illustrates how each call can be commenced only if certain conditions (i.e., the "line conditions"), relating to the transmission channel are met. The signal strength process is preferably performed by the software executed by the processor 34 within the cellular data transceiver 10.

By way of background, cellular telephone technology offers the capability of giving a user an indication of the expected line conditions, or quality of a call, by monitoring the received signal strength from the local cell site and displaying it. Traditionally, cellular telephone equipment provides an indication of signal strength by giving the user a visible display of a series of bars on a bar graph to indicate the strength of the signal. From this cell site signal quality determination, the expected quality of the analog channel of a telephone call can be extrapolated before it is placed. See, for example, U.S. patent application Ser. No. 07/720,638, filed Jun. 25, 1991, now abandoned issued as U.S. Pat. No. 5,241,565 on Aug. 31 1993, and assigned to the present assignee. This signal strength is available prior to a call because under cellular phone systems standards, activated cellular telephone equipment is always in contact with a cellular site even when no calls are in process. As is well known, calls placed at low signal levels often encounter impairments which cause errors; and therefore require retransmission, lengthening the overall data transmission time so as to increase transmission costs. Therefore, by implementing an auto dialing modem in accordance with the present invention, the user can preset the minimum signal level at which a call may be made. When the signal strength goes below the preset level, the placing of a call is delayed until the signal strength increases. If, on the other hand, data is already transferred into the modem, it is held until the call can be successfully completed. In this manner, only calls with a high probability of data throughput success are placed, thus significantly reducing service charges to the user.

Referring to FIGS. 1 and 2, the call attempt procedure begins with a receive command to dial instruction step 201 as shown in FIG. 2. This command is issued by protocol and control processor 34 through interface 38 to cellular data transceiver controller 42 based upon dialing instructions preprogrammed, or those received through data terminal equipment interface 32. After receiving a command to dial, the process reviews whether an override command has been issued at step 202. This override command is a mechanism which allows the user to place a data call regardless of the quality of the data link between the cellular unit and the local cell site. This may be necessary during an emergency or some other period of time when it is absolutely crucial that data be transmitted, regardless of cost. If no override command has been issued at step 202, then received signal strength is read at process step 203. As noted, the signal strength is provided by controller 42 to display 22 and is provided in parallel by control line 33(a) to the protocol and control processor 34. Upon reading the signal strength, the protocol and control processor 34 compares the signal strength to a predefined threshold at process control step 204. As noted above, this predefined signal strength threshold may be predefined by software or may be entered by the user through the keypad 24 or through the data terminal equipment interface 32. Should the signal strength be below the threshold at process step 204, then the process will return to process control step 203. Once the signal strength rises above the predefined threshold for a sufficient length of time, then the protocol and control processor 34 will begin dialing by issuing commands over control line 39 to the input of controller 42 as noted at the dial process step 205. In this way, by using a combination of hardware and software as described above, improved data throughput, and a reduction in operating costs, may be realized by only initiating calls when the RF signal strength at the cellular telephone unit is above a predefined signal strength threshold.

Complementary to the above noted circumstances, it is often the case that while conditions may be present which result in signal strength being strong enough to start a data transfer, variation in the channel conditions (such as occur while traveling within a large city with many tall buildings) might result in a received signal not being strong enough for a sufficient length of time to effectively transfer data in a reasonable and economical manner.

Some examples of the above conditions include a marginal antenna or antenna cable, a weak cellular signal, etc. Under these conditions, a modem could try to transmit data for long periods of time without success and thus incur a large cellular service bill. To overcome this problem, an automatic disconnect on low signal strength procedure is incorporated into the instant invention and is described in more detail in FIG. 3. In operation, the auto disconnect feature monitors the amount of time that the modem has been off-hook, or on the air, and after a preset time under software control, examines signal strength. If the signal is of marginal strength, the modem will automatically disconnect and then attempt to retransmit data when the signal strength is restored, executing the call attempt based on signal strength, described above and shown in FIG. 2. If the signal strength is acceptable, the modem will continue trying to send the data for up to a second preset time at which time the modem will automatically disconnect. Since the two noted preset timers are under software control, they may be reconfigured to maximize cost savings based upon local cellular telephone tariffs.

Figure 3:
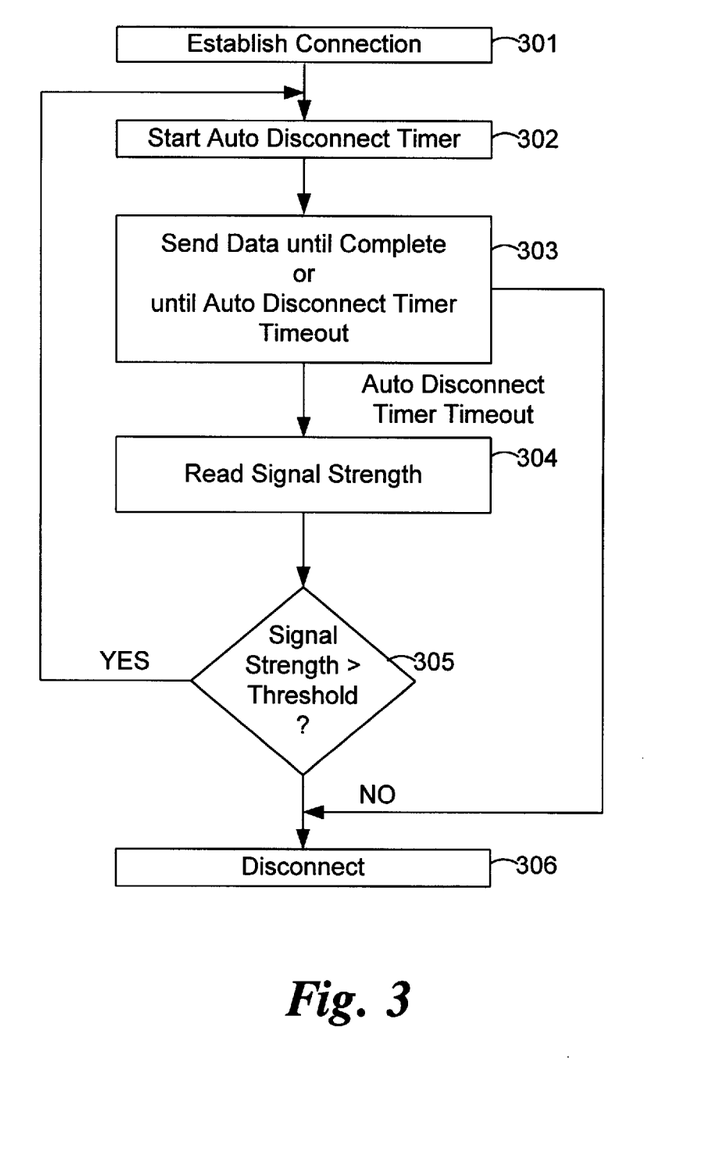
FIG. 3 is a flow chart of the process as performed by the software under control of the cellular data transceiver of FIG. 1, wherein an established connection will be automatically disconnected during periods of low cellular signal strength.

Referring in detail to FIG. 3, the first step of automatically disconnecting on low signal strength is to establish a connection at step 301. Upon establishing a connection, an automatic disconnect timer is set at step 302. Data is then sent until complete in process step 303, or until the automatic disconnect timer runs out. If data is complete, then the flow process flows through to a disconnect at 306 and the data transmission is finished. On the other hand, if data is still in the process of being sent, after the automatic disconnect timer runs out, then the signal strength is read again at process step 304. If the signal strength is still above a predetermined threshold, then the automatic disconnect timer is reset and data is continued to be sent until complete or until the automatic disconnect timer times out once again. On the other hand, should the signal strength be below a predetermined threshold, then the automatic disconnect will disconnect on low signal strength. This feature is particularly important when a user desires to transmit short data packets which may be reliably transmitted within the time period established by the auto disconnect timer. In this way, if a short data packet cannot be reliably transmitted due to noise, the transmission will be disconnected and the process will restart when the signal conditions are sufficient to complete the call in a short period of time, thus reducing telephone cost charges. In addition, because the auto disconnect timer and repeat timer may be programmed, various data types and message transmission systems may be accommodated by appropriately adjusting timers.

Figure 4:
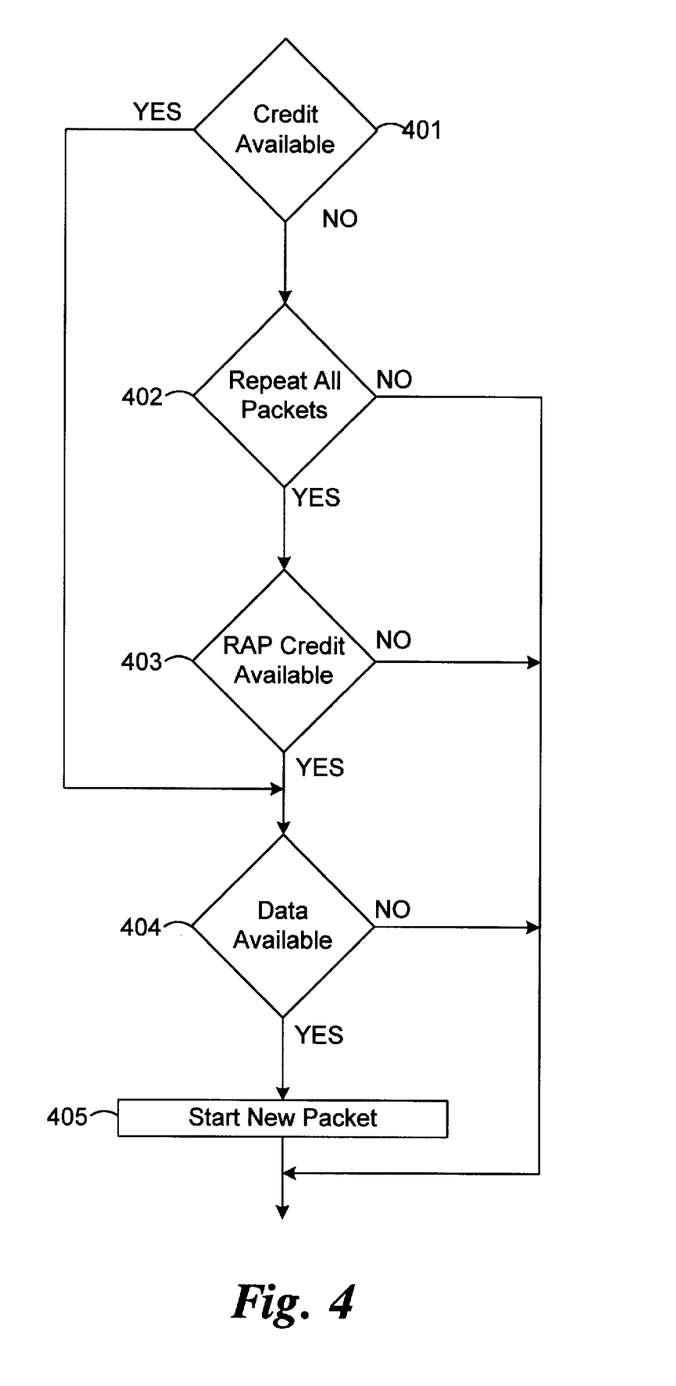
FIG. 4 is a flow chart of the process as performed by the software under control of the cellular data transceiver of FIG. 1, wherein the MNP protocol is modified to repeat the transmission of all packets until an acknowledgement is received from the receiving station.

Referring now of FIG. 4, a further improvement to the instant invention is disclosed. Under the MNP protocol, modems send and receive data in packets. When data is flowing, the sending modem may send data faster than the receiving modem can process it, and thus may have several outstanding packets (that is, data which has been sent but not acknowledged). It is the responsibility of the MNP protocol and its coordination through the sending and receiving units to manage the receiving modem's buffer allocation. When applications are run which involve sending only a small amount of data, and when that data will fit into the receiving modem's buffer, the repeat of all packets procedure described in FIG. 4 will optimize data transmission to ensure reception and reduce costs. In a noisy cellular transmission environment, the repeat all data packets feature takes advantage of short message size and the receiving modem's; buffer size and, by assuming that data will not get through, repeats the transmission of all data until the remote modem acknowledges receipt or is otherwise disconnected by the auto disconnect feature. This "brute force method" starts at process step 401 of FIG. 4, where the sending modem in the cellular unit looks to see whether any credits under the MNP standard are available. As noted, these credits are closely related to the buffer size available in the receiving modem. If credits are available, then the protocol checks to see whether data is available to be sent at process step 404. If data is also available, then a new packet is started at step 405 and packet transmission may begin. Alternatively, if credits are not available, the process will move to the repeat all packets stage of step 402 to determine whether all packets are currently being repeated. If all packets are currently being repeated, then the process will travel through the no branch of the decision tree and will continue repeating all packets. On the other hand, if all packets are not currently being repeated, then the yes flag will be set and a repeat all packets credit check will be performed by process step 403. If no credit is available, then the process will flow through to the output. On the other hand, if a repeat all packets credit is available, then the process will fall through to the data availability test at step 404 and continue as usual. By following this procedure, the MNP protocol is modified so that should credits be available, data will be transmitted as normal. On the other hand, should credits not be available, then the modem will continue to repeat all packets until acknowledgement thereby increasing the likelihood of successful data transmission while decreasing the amount of time needed to transmit all data.

Figure 5:
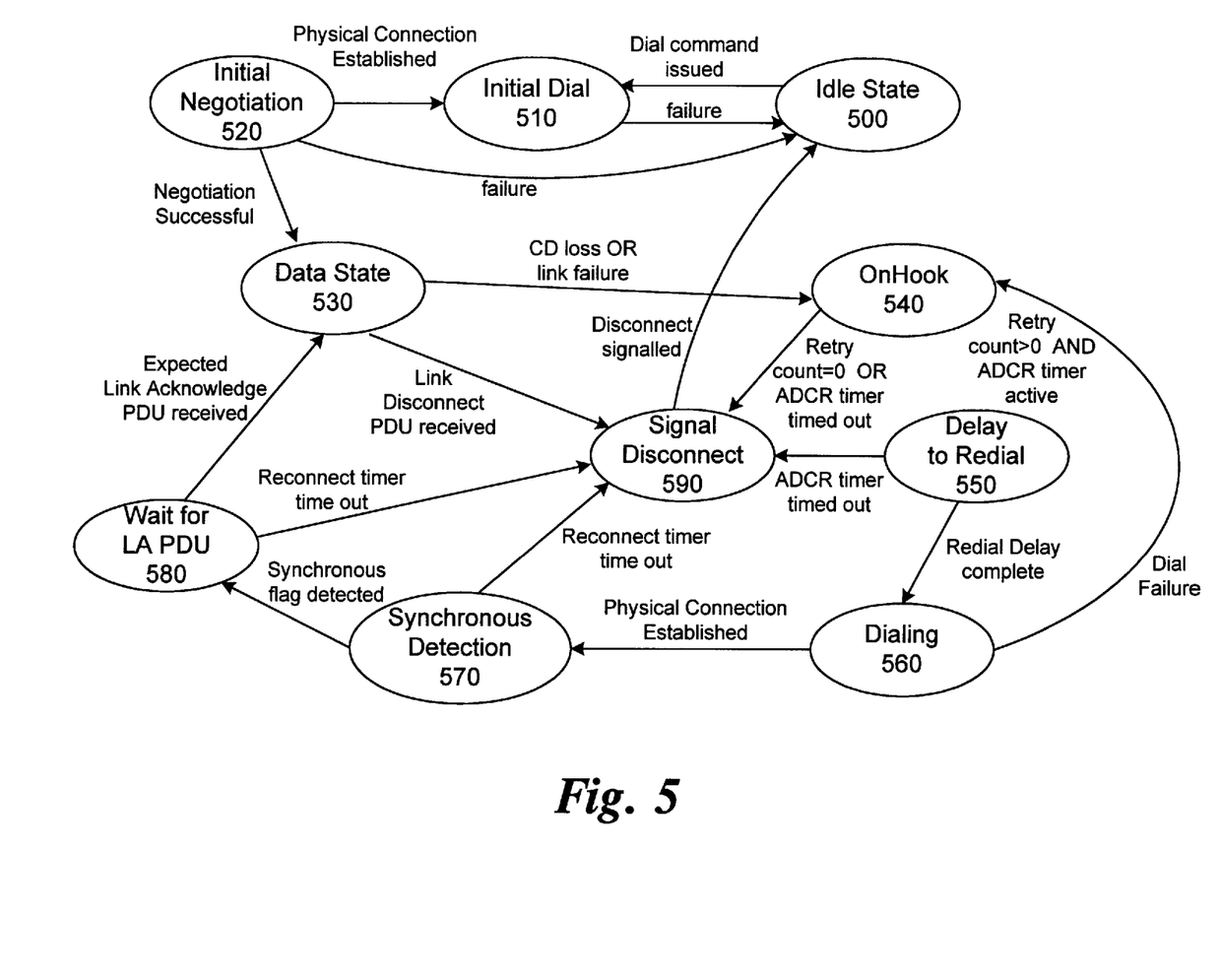
FIG. 5 is a state diagram illustrating the call back state machine for the originating station to automatically and transparently re-establish communications after a disconnect.
Figure 6:
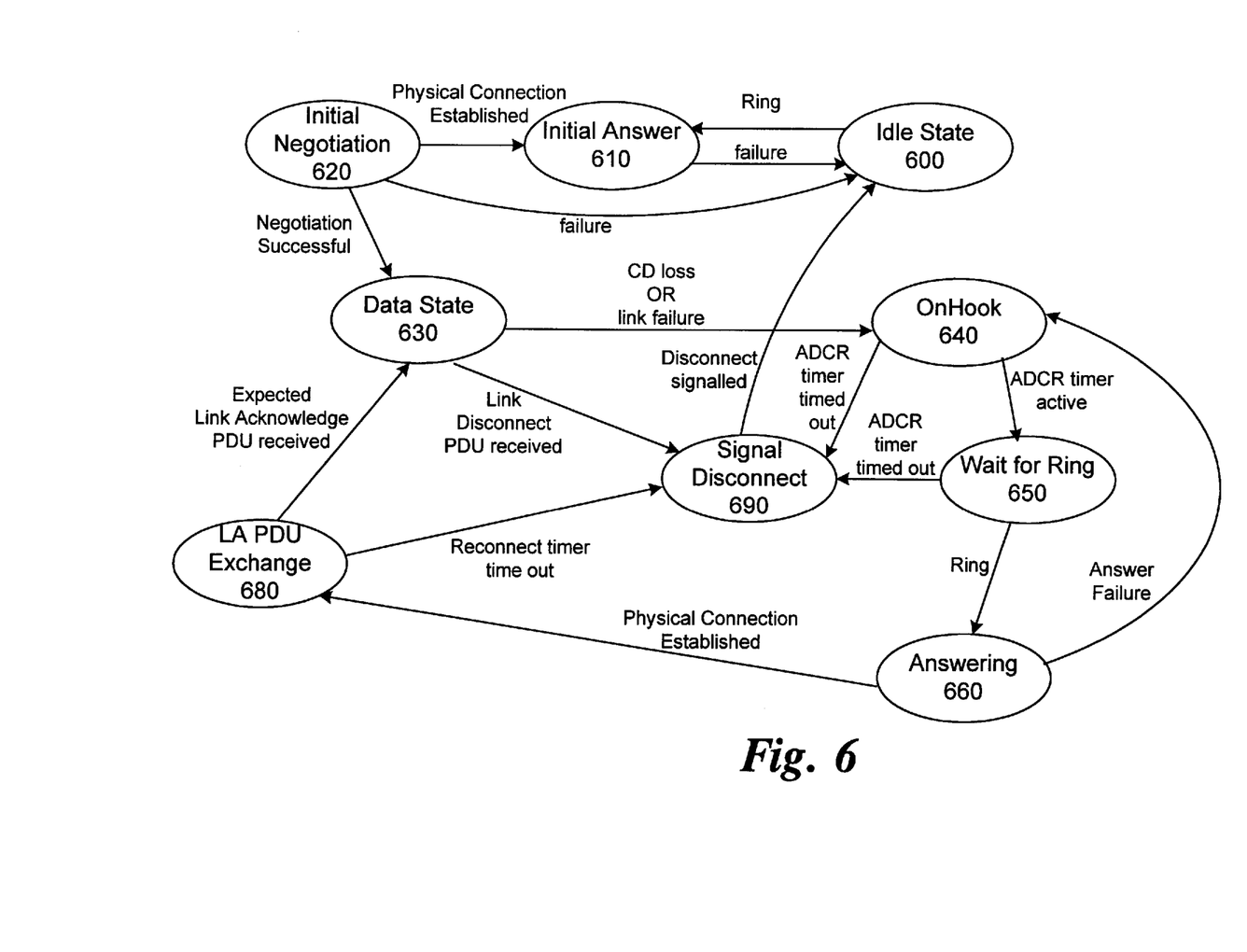
FIG. 6 is a state diagram illustrating the call back state machine for the answering station in communication with the originating station of FIG. 5, to transparently re-establish communications after a disconnect.

Yet another improvement incorporated into the instant invention is an automatic dial connection restoration process. When using modems to transfer files over noisy or poor quality dial communications channels or links, it is often the case that the link may be dropped during transmission requiring retransmission of the entire file. As noted above, while transmitting a short file it may be desirable to drop the link and retransmit the entire file in order to save costs. However, when transmitting a lengthy file, and especially if the first file transmission is already almost finished, such retransmission of the complete file may actually increase the total transmission costs. Therefore, it is desirable to provide a mechanism by which a dropped data link may be transparently re-established and data transmission continued from the point where the disconnect occurred. Referring to FIGS. 5 & 6, the call back state machine for the dialing modem and the call back state machine for the answering modem are shown. In operation, a link (for example using the MNP error correction protocol) is initially established between a pair of modems which are configured for automatic dial connection restoration. When the transmitting modem detects a carrier loss and the remote modem has not signaled a link disconnection, the following sequence of events will occur:

1. Both modems will disconnect but retain the state of the error correcting protocol as well as the state of the data compression tables if data compression is in use.
2. Both modems will prevent the flow of data to and from their respective data terminal equipment units.
3. The originating modem will dial the last number dialed and the answering modem will answer in response to that incoming ring signal and a physical connection will be re-established.
4. The modems will resynchronize their MNP protocol.
5. Both modems will allow the flow of data to and from their respective data terminal equipment elements and file transfer will continue.

As defined, the invention allows for repeating this process if step 3 above fails. A user selectable timer will determine the maximum time the modem will retry to reconnect. If the modems fail to re-establish the connection, then the modems will signal their data terminal equipment that the modem has permanently disconnected and any retransmission from that point on must again start from the beginning.

Referring now to FIG. 5, the call back state diagram for the dialing modem will be described in detail. Starting with idle state 500, the dialer will wait for the issuance of a dial command. This will advance the state machine to initial dial state 510, where the actual dialing will occur. If the dialing sequence fails, then the state machine will return from initial dial 510 to idle state 500. However, if the initial dial is successful, then a physical connection will be established and the initial negotiation state will be entered. Once again, if the initial negotiation 520 is a failure, then the state will return to the idle state 500. However, if the initial negotiation is successful, then the data state 530 will be entered. This is the normal state where data will be transferred between the dialer and the answerer. In data state 530, if a carrier detect loss or link failure should occur, the state of the machine will move to an on hook condition 540. Assuming that the automatic dial connection restoration timer (ADCR) has still not timed out, the state machine will move to state 550, delay to redial. The delay to redial state will then establish whether or not a predefined number of redial attempts have already been exceeded. If the retry count is equal to zero, then the state machine will move to state 590 signal disconnect and the DTE will be informed of the disconnect. However, if the counter has not yet been reduced to zero, the state machine will move to dialing state 560. If a dialing failure should be encountered, the state machine will move back to the on-hook state 540 and the retry counter will be decreased by one. On the other hand, if dialing should be successful and a physical connection established, then the state machine will move to synchronous detection state 570. It is at this point that the modem which has been in an asynchronous mode, switches into a synchronous mode and looks for a synchronous detection signal from the answering modem. If a synchronous flag is detected, then the state machine will move onto state 580, wait for a "link acknowledgement—protocol data unit" in accordance with the MNP protocol. This state means that a physical link has been detected and both modems will synchronize with each other to make sure that the call which is going to be continued is the same call which was previously interrupted. This is necessary since it is possible, although not likely, that an intervening call may arrive at either modem and thereby receive data which was not directed to it. If the link acknowledgement protocol data unit signal is received at state 580, then the state machine moves onto data state 530. If, on the other hand, no acknowledgement is received or an incorrect acknowledgement is received, a timeout signal is generated and the signal disconnect state is reached.

Once in the data state, the state machine will remain in the data state until a link disconnect from the protocol data unit is received indicating that an end of transmission, or an additional carrier detect loss or link failure has occurred.

Reviewing FIG. 6, the state machine for call back for the answerer is illustrated. The state machine is a substantial mirror image of the state machine of FIG. 5. The answering device starts in an idle state 600. Upon receiving an incoming ringing signal, the state machine moves to an initial answering state 610. If the answer is unsuccessful, then the system returns to its idle state 600. However, if the answer is successful, then a physical connection is established and the initial negotiation state 620 is entered. During the initial negotiation, if the negotiation fails, then the answerer returns to idle state 600. On the other hand, if the initial negotiation is successful, then data state 630 is entered. This is the normal operating state where data is transferred. At data state 630, should a carrier detect loss or link failure occur, the receiving modem will go on-hook at state 640. Once again, the automatic dial connection restoration timer will be checked to see whether the timer has timed out. If the timer has timed out, then a signal disconnect and idle 690 state will be entered. If the timer has not timed out or the retry count is greater than zero, then a wait for ring state will be entered 650. In this state of FIG. 5, and different from the dialing machine state, the answering (or dialed) unit will wait for a ring signal for only a predetermined period of time. If the return call has not arrived before the timer has expired, then a signal disconnect will be issued to the DTE. Should a call arrive and ringing be detected, the state machine will go into the answering state 660. This stale will attempt to make a successful answer. If the answer fails then the system will go back on-hock at state 640. On the other hand, if the answer is successful, the answering unit will establish a physical connection and will move to state 680 link acknowledgement protocol data unit exchange. As in the dialer state diagram, if no PDU is acknowledged before timeout, a signal disconnect state will be reached. On the other hand, if the link is acknowledged and the expected PDU is received, then data state 630 will be entered. Data state 630 will be the active state until the link is disconnected in which case the signal disconnect state 690 will be entered. However, if a carrier detect loss or link failure is detected, then the system will go on-hock at 640 and continue the state operation.

By using such a system, a data link may be established and then reliably re-established when dropped without the need to retransmit all of the information from the beginning. This is advantageous in that it cuts down transmission time and, thereby, cuts down the costs associated with cellular data transmission.

Finally, in an effort to control costs and track cellular data calls more closely, the invention incorporates cellular billing timers. In the normal public switched telephone network, the user or dialing party is only charged for the duration of the connection to the dialed party. This, however, is not true of cellular service. In cellular service, the dialing party is charged from the moment that the mobile telephone switching office seizes a land trunk to place the call. This time can add many seconds to a customer's bill. In addition, since no single cellular carrier can provide country-wide service or produce a single bill for such service, a customer must deal with separate phone bills when using multiple service providers. In order for the user to calculate his/her/its own billing, the device of the instant invention utilizes a timer to record the total call time. The device then attaches a small data packet containing this timer information to the MNP protocol frame in order to send the duration of the off hook billing time on a per call basis to the receiving device. Alternatively, this timer information can the transmitted along the transmitted data. This small data packet of additional timer data may then be stripped from the protocol frame at the receiving end and used to log the duration of the call. In addition to the timer information, the small data packet can include other information such as the transmission date, the transmission time, the communications channel quality, a transmitter identification number and the size of the data transmitted. This data can be used to form the basis of an estimated billing system. In a multi-caller system, calls may be identified by attaching the electronic serial number of the cellular phone which made the call, and which is unique to the number of the protocol frame that contains the timer. This is done automatically by the software.

Referring to FIG. 7, a chart showing a sample date generated cellular call analysis is provided. The call analysis may contain a number of fields including:

1. PRT—the communications port on the PC which collected the incoming data.
2. CHK—checking information as to whether or not a received record was completed or incomplete.
3. Date and time of the call received.
4. Unit ID—the electronic serial number of the calling cellular telephone.
5. SID—this is the received signal strength which may be digitized and transmitted.
6. UNSCCA—this is the count of unsuccessful call attempts since the last successful call.
7. Byte Count—this is the number of bytes of data sent in this particular call including messages and data.
8. Send CD Time—this is the time between the electronic equivalent of pressing the send button on a cellular phone and getting a carrier detect. This is, in affect, the billable cellular call set up time and is displayed in seconds.

9. CONN Time—this is the time during which data is transmitted.

10. EST Bill Time—this is the estimated billable time provided in seconds.

By providing the above-noted billing information, charges for cellular phone calls may be tracked more closely and thus cost controlled by the adjustment of call duration timers within the software and state machines as appropriate.

It should be appreciated that all of the procedures described in connection with FIGS. 2–6 can be performed by software provided in the protocol and control processor 34. The preferred software is shown in Appendix A, attached to and made a part of this specification.

Figure 8A:
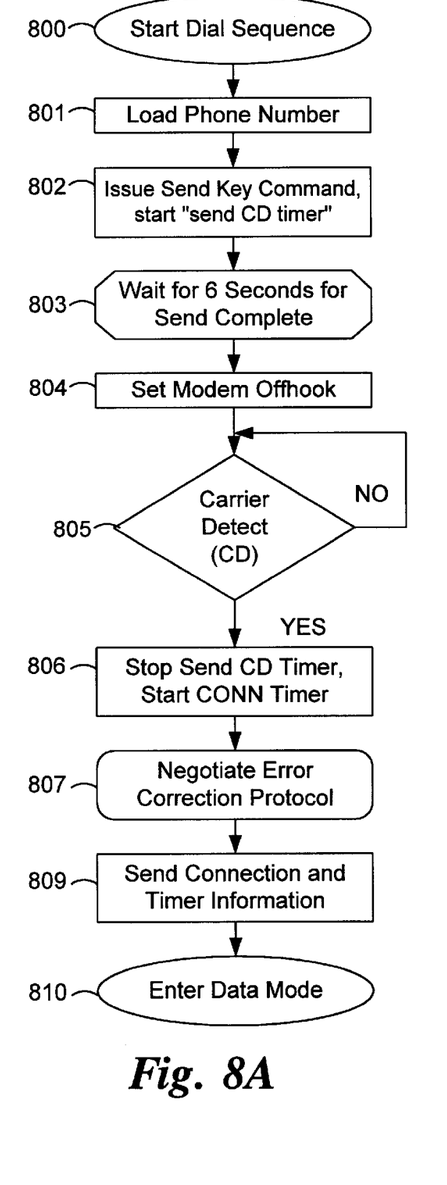
FIG. 8A is a flow chart showing a dial sequence for entering a data state.
Figure 8B:
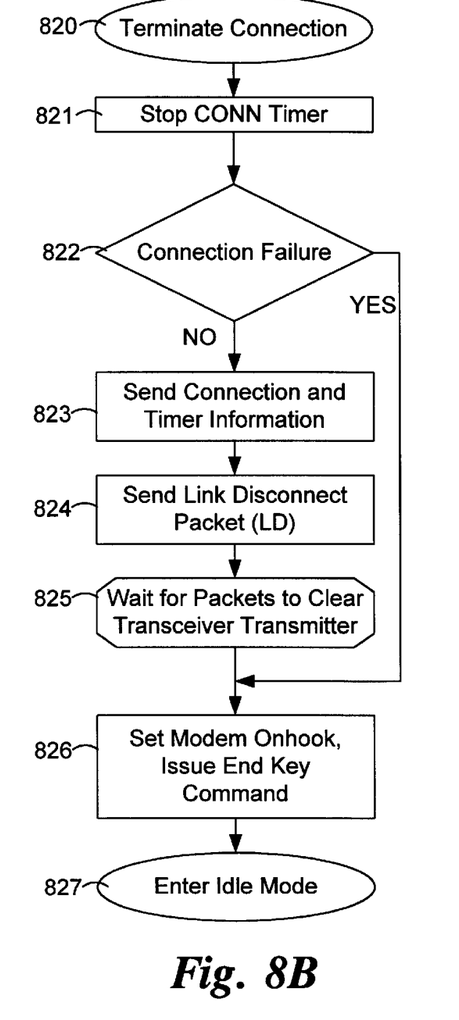
FIG. 8B is a flow chart showing an event sequence, conditional upon connection, for entering an idle data state.

The flow charts illustrated in FIGS. 8A and 8B are executed by the modem protocol and control processor 34 of FIG. 1 to determine and deliver the "send CD time" and "CONN time," shown listed in FIG. 7. The estimated billing time is the sum of the "send CD time" and the "CONN time".

Referring to FIG. 8A, when the protocol and control processor 34 receives a command to dial a number through the DTE interface 32, the processor 34 starts the dial sequence for dialing the number at step 800. In step 801, the control processor 34 loads the phone number into the transceiver controller 42 by sending a keyboard command via interface 33b. Once the phone number has been loaded, the modem processor 34 issues a "send key" command to the transceiver controller 42 in step 802, and starts the "send CD timer", i.e., the billable cellular call set-up time, as hereinbefore explained.

In step 803, the processor 34 waits for a time (e.g., six seconds) sufficient to let the analog processor 44 deliver the phone number and then, in step 804, sets the modem to the "off hook" state, wherein the modem is ready to start the modulation handshake.

The modem processor 34 waits for completion of the modulation handshake in the loop at step 805 wherein it is decided whether carrier detect (CD) has occurred. When the modulation handshake is completed, the signal processor 36 informs the modem processor 34 via the line 35 that carrier detect (CD) has occurred. The modem processor 34 then advances processing to step 806, thereby stopping the send CD timer and starting the CONN timer. In step 807, the modem processor 34 typically negotiates the error correction protocol with the remote modem with which it is attempting to communicate. An error correction protocol negotiation as in step 807 is preferred, but not necessary, provided there is a mutually supported protocol for the modem processor 34 to transmit the timer information, as performed in step 809, to the remote modem where it can be subsequently routed to a billing estimating system. After step 809, the modem 30 enters data state 810 and can thereby begin data transmission. The modem remains in data state until the modem processor 34 receives a command to disconnect via the DTE port 32, or until the modem processor 34 detects a connection failure.

With reference to FIG. 8B, when the modem processor 34 detects either of these events, the processor 34 leaves the data state, as represented by step 820, to initiate a connection termination sequence. The connection timer, started in step 806, is stopped in step 821.

In step 822, the reason for leaving the data state is ascertained. If the data state is departed due to a connection failure, then processing continues at step 826. If, alternatively, the connection has not failed, then the modem processor 34 sends the connection and timer information at step 823, and then sends a link disconnect packet (LD) at step 824 to notify the remote modem that the connection is being terminated.

The connection is then terminated in step 826 by placing the modem 30 in the "onhook" state, and issuing an "end key" command to the transceiver controller 42. The cellular data transceiver 40 then enters the "idle state" at step 827.

Thus, as can be seen above, by incorporating the improvements of the present invention, lower costs and more efficient data transmission may be made over a cellular network. It is understood that while the above description is directed to a cellular network, the invention is not limited to a cellular system, but may be used for any RF, wired or any other type of data transmission system. It is also understood that while the current system is designed for use with a cellular phone system which transmit analog information, the present invention may be easily modified to be used with a digital cellular telephone network or other digital communications network by modifying the modulation demodulation signal processor 36 of modem 30 to create packets of information in a digital format that are modulated in the appropriate format. Finally, while the preferred embodiment has been described in connection with the MIP protocol the principles of the present invention can be used with other protocols, such as HDLC based LAPM (Link Access Procedures for Modems).

Since certain changes may be made in the above apparatus, without departing from the scope of the invention herein involved, it is intended that all matter contained in the above description or shown in the accompanying drawing shall be interpreted in an illustrative and not in a limiting sense.

What is claimed is:

1. An apparatus for selectively transmitting and receiving data over a communications channel to and from a remote site, the communications channel having a determinable level of data transmission quality, said apparatus comprising:

data interface means for transferring data to and receiving data from a data source;

modulation means for modulating said data received from said data source in accordance with a transmission format so as to produce outgoing modulated data to be transmitted to said remote site;

demodulation means for demodulating incoming modulated data received from said remote site;

transceiver means for transmitting said outgoing modulated data over said communications channel and for receiving said incoming modulated data from said communications channel;

measuring means for measuring the level of data transmission quality of the communications channel irrespective of whether a connection has been established with the remote site;

connecting means for establishing a connection across said communication channel with said remote site if said level of data transmission quality of the communications channel is above a first predefined threshold level;

means for activating said measuring means so as to measure the level of data transmission quality of the communications channel at the end of each of successive time intervals after a connection has been established with the remote site so long as data is required to be transferred to said remote site and the connection with said remote said has not been terminated; and means for immediately terminating said connection with said remote site if the measured level of signal transmission quality of the communication channel at the end of any of the time intervals is below a second predefined threshold level.

2. The apparatus, as claimed in claim 1, wherein said connecting means includes means for establishing a connection with said remote site if the level of data transmission quality of the communication channel rises above the first predefined threshold level for a predefined period of time.

3. The apparatus, as claimed in claim 1, wherein said communications channel is at least partially defined by a cellular communications network having at least one cell site for transmitting signals to and receiving signals from said apparatus and said measuring means measures the level of data transmission quality of said signal transmitted from said cell site as a function of the signal strength of said transmitted signal.

4. The apparatus, as claimed in claim 1, further comprising:
    means for forcing said connecting means to establish a connection with said remote site even if said level of data transmission quality of the communications channel is below said first predefined threshold level.

5. The apparatus, as claimed in claim 1, further comprising:
    means for transmitting modulated data in a plurality of data packets and for repeating the transmission of any one of said data packets until either one of the following two events occurs: (1) an acknowledgement of reception of said data packet is received by said apparatus, or (2) the connection with said remote site is terminated.

6. The apparatus, as claimed in claim 1, further comprising:
    handset means including a manual control for controlling said transceiver means independently of said connecting means.

7. The apparatus, as claimed in claim 6, wherein said handset means further comprises:
    display means for displaying an indication of information received from said connecting means,
    keypad means for entering information into said apparatus,
    speaker means for reproducing audio information received from said transceiver means, and
    microphone means for modulating audio information into a format to permit said audio information to be transmitted by said transceiver means.

8. The apparatus, as claimed in claim 7, wherein said modulation means is connected to said transceiver means to permit said modulation means to provide said outgoing modulated data to said transceiver means without passing said outgoing modulated data through said microphone means or said speaker means; and
    wherein said microphone means is connected to said transceiver means to permit said microphone means to provide voice information to said transceiver means without passing said voice information through said modulation means.

9. The apparatus, as claimed in claim 6, further comprising call costing means for recording call costing information about each transmission session, and for permitting said call costing information to be transmitted by said transceiver means to said remote site, said information including at least one of transmission time, transmission date, communications channel quality, a transmitter identification number and the size of the data transmitted, said call costing means including means for receiving incoming call costing information over said communications channel.

10. A method of selectively transmitting and receiving data over a communications channel to and from a remote site, wherein the communications channel has a determinable level of data transmission quality, the method including the steps of:
    providing measuring means for measuring the level of transmission quality of the communications channel irrespective of whether a connection has been established with the remote site;
    establishing a connection across said communication channel with said remote site if said level of data transmission quality of the communications channel is above a first redefined threshold level;
    activating said measuring means so as to measure the level of data transmission quality of the communications channel at the end of each of successive time intervals after a connection has been established with the remote site so long as data is required to be transferred to said remote site and the connection with said remote site has not been terminated; and
    immediately terminating said connection with said remote site after the connection is established if the measured level of data transmission quality of the communication channel at the end of any of the time intervals is below a second predefined threshold level.

11. The method, as claimed in claim 10, wherein said step of establishing a connection across the communication channel establishes a connection with said remote site only if the level of data transmission quality of the communication channel rises above the first predefined threshold level for a predefined period of time.

12. The method, as claimed in claim 10, wherein said communications channel is at least partially defined by a cellular communications network having at least one cell site for transmitting and receiving signals; and
    said measuring means measures the signal strength of said transmitted signal.

13. The method, as claimed in claim 10, further including the step of:
    establishing a connection with said remote site even if said level of transmission quality of the communications channel is below said first predefined threshold level.

14. The method, as claimed in claim 10, further comprising the step of:
    transmitting modulated data in a plurality of data packets and repeating the transmission of any one of said data packets until either one of the following two events occurs: (1) an acknowledgement of reception of said data packet is received by said apparatus, or (2) the connection with said remote site is terminated.

15. The method, as claimed in claim 10, further comprising the step of:
    recording call costing information about each transmission session, and transmitting said call costing information to said remote site, said call costing information including at least one of transmission time, transmission date, communications channel quality, a transmitter identification number and the size of the data transmitted.

16. The method, as claimed in claim 15, further comprising the step of:
    receiving incoming call costing information over said communications channel.

17. An apparatus for selectively transmitting and receiving data over a communications channel to and from a remote site, the communications channel having a determinable level of data transmission quality, said apparatus comprising:

data interface means for receiving data from and transferring data to a unit of data terminal equipment, measuring means for measuring the level of data transmission quality of the communications channel;

connecting means for establishing a connection across said communication channel with said remote site if said level of data transmission quality of the communications channel is above a first predefined threshold level;

means activating said measuring means to measuring the level of transmission quality of the communications channel at successive predefined time periods after a connection has been established with the remote site so long as data need to be transferred to said remote site and the connection across said communication channel has not been terminated; and means for immediately terminating said connection with said remote site if the level of signal transmission quality of the communication channel measured at any of said predefined periods after the connection is established is below a second predefined threshold level.

* * * * *